United States Patent
Sakairi

(10) Patent No.: US 8,840,073 B2
(45) Date of Patent: Sep. 23, 2014

(54) LEG STRUCTURE

(75) Inventor: Shigemitsu Sakairi, Tsukubamirai (JP)

(73) Assignee: SMC Kabushiki Kaisha, Tokyo (JP)

( * ) Notice: Subject to any disclaimer, the term of this patent is extended or adjusted under 35 U.S.C. 154(b) by 57 days.

(21) Appl. No.: 13/391,926

(22) PCT Filed: Aug. 27, 2009

(86) PCT No.: PCT/JP2009/064930
§ 371 (c)(1),
(2), (4) Date: Feb. 23, 2012

(87) PCT Pub. No.: WO2011/024274
PCT Pub. Date: Mar. 3, 2011

(65) Prior Publication Data
US 2012/0153100 A1 Jun. 21, 2012

(51) Int. Cl.
*F16M 11/04* (2006.01)
*B01D 35/30* (2006.01)
*F16M 11/00* (2006.01)
*F16M 11/22* (2006.01)

(52) U.S. Cl.
CPC ............... *B01D 35/30* (2013.01); *F16M 11/00* (2013.01); *F16M 11/22* (2013.01)
USPC ........... 248/131; 248/136; 248/146; 220/629; 222/180

(58) Field of Classification Search
USPC .................. 220/629, 475, 630; 222/129, 180, 222/181.3, 182, 185.1, 482, 485; 248/131, 248/136, 144, 145, 146, 150, 166, 176.3, 248/907, 440.1; 221/186, 188, 190, 283, 221/284; 239/268
See application file for complete search history.

(56) References Cited

U.S. PATENT DOCUMENTS

| | | | | |
|---|---|---|---|---|
| 548,284 | A * | 10/1895 | Atkinson et al. | 248/136 |
| 1,609,207 | A * | 11/1926 | Schlabaugh | 248/136 |
| 2,324,747 | A * | 7/1943 | Weissert | 248/137 |
| 3,167,205 | A * | 1/1965 | Smith | 248/133 |
| 4,162,796 | A * | 7/1979 | Mead | 280/830 |
| 4,744,536 | A | 5/1988 | Bancalari | |
| 6,517,036 | B1 * | 2/2003 | Ramirez, Jr. | 248/150 |

(Continued)

FOREIGN PATENT DOCUMENTS

| | | |
|---|---|---|
| JP | 47 12521 | 10/1972 |
| JP | 2 93231 | 7/1990 |
| JP | 2001 353640 | 12/2001 |

OTHER PUBLICATIONS

International Search Report Issued Dec. 1, 2009 in PCT/JP09/64930 Filed Aug. 27, 2009.

(Continued)

*Primary Examiner* — Tan Le
(74) *Attorney, Agent, or Firm* — Oblon, Spivak, McClelland, Maier & Neustadt, L.L.P.

(57) ABSTRACT

A leg structure supports in an upright position a container having a piping port in the bottom of the container. The leg structure is provided with fixed legs fixed or removably mounted to the container, a movable leg capable of moving relative to the fixed legs so as to approach and be separated in the horizontal direction from the fixed legs while supporting the container, and the connecting section for connecting the container and the fixed legs to each other such that the container is maintained upright relative to the fixed legs.

7 Claims, 8 Drawing Sheets

(56) References Cited

U.S. PATENT DOCUMENTS

| | | | |
|---|---|---|---|
| 7,032,259 B1 | 4/2006 | Kilion | |
| 7,350,671 B2 * | 4/2008 | Mika et al. | 248/136 |
| 2001/0035380 A1 | 11/2001 | Goldman | |
| 2003/0150964 A1 * | 8/2003 | Sherer et al. | 248/146 |
| 2006/0202092 A1 * | 9/2006 | Johnson | 248/146 |
| 2010/0276513 A1 * | 11/2010 | Huff | 414/809 |

OTHER PUBLICATIONS

Office Action issued Aug. 28, 2013 in German Patent Application No. 11 2009 005 166.9.

* cited by examiner

LEG STRUCTURE

TECHNICAL FIELD

The present invention relates to a leg structure for supporting a container in an upright condition.

BACKGROUND ART

Heretofore, leg structures have been known that serve to support a container in an upright or upstanding condition. Such a container, for example, serves to accommodate therein a filter that removes foreign matter (solid components) contained within a liquid. The container is supported in an upright posture by attaching a plurality of legs to the bottom portion of an outer circumferential surface of the container.

As a first conventional example of a leg structure for supporting this type of container, a fixed-type leg structure is known (for example, refer to Japanese Laid-Open Patent Publication No. 2001-353640).

FIG. 1 is an overall perspective view of a filter 100 equipped with a fixed-type leg structure 104. As shown in FIG. 1, the filter 100 comprises a container 102, and the leg structure 104 that serves to support the container 102. The container 102 includes an inlet port 106 provided on an upper side of the outer periphery thereof and through which a liquid to be processed is introduced, and a discharge port 108 provided on a lower side of the outer periphery thereof and through which the filtered liquid is discharged. In addition, on the lower portion of the container 102, a liquid removal opening 110 is provided, through which liquid, which has collected inside the container 102, is discharged when maintenance operations are performed. Tubes (not shown) are connected respectively to the inlet port 106, the discharge port 108, and the liquid removal opening 110. The leg structure 104 is attached to a lower portion on the outer peripheral surface of the container 102. The leg structure 104 includes a plurality of legs 112a, 112b, 112c (three as shown in the drawing), which are arranged at given intervals mutually in the circumferential direction of the container 102. The legs 112a to 112c are each affixed respectively by welding to the outer peripheral surface of the container 102.

As a second conventional example of a leg structure for supporting the container, a detachable-type leg structure also is known. FIG. 2 is an overall perspective view of a filter 120 equipped with a detachable-type leg structure 122. As shown in FIG. 2, the leg structure 122 includes two semicircular members 124, and a plurality of legs 126a to 126d, which are attached to each of the semicircular members 124. The two semicircular members 124 are attached to the container 102 as a result of being fastened together mutually by bolts 128 and nuts 130 while sandwiching the container 102 therebetween. On the other hand, the two semicircular members 124 are configured to be separable from the container 102 by releasing the fastening of the bolts 128 and the nuts 130. In other aspects thereof, the structure of the container 102 shown in FIG. 2 is the same as that of the container 102 shown in FIG. 1.

SUMMARY OF INVENTION

Incidentally, when an operation (tubing installation) is performed to connect tubing with respect to the liquid removal opening 110, which is disposed on the bottom of the container 102, from the standpoint of obtaining good workability, it is desirable that an operating space be secured around the liquid removal opening 110.

However, with the fixed-type leg structure 104 shown in FIG. 1, the legs 112a to 112c are fixed respectively by welding to the container 102, and the interval between the respective legs 112a to 112c is narrow. Thus, since a sufficient operating space cannot be secured, a problem occurs in that the tubing installation operation is difficult to carry out.

With the detachable-type leg structure 122 shown in FIG. 2, although an operating space for tubing installation on the liquid removal opening 110 can be secured by separating the legs 126a to 126d from the container 102, in a condition in which the legs 126a to 126d have been separated therefrom, the container 102 cannot be maintained in an upright posture. For this reason, a problem occurs in that workability is made worse and the tubing installation cannot be performed while the container 102 is kept upstanding.

The present invention has been made taking into consideration the aforementioned problems, and has the object of providing a leg structure, which enables a tubing installation operation to be carried out easily with respect to a tubing port disposed on the bottom of a container while the container is kept in an upright posture.

For achieving the aforementioned object, the present invention is characterized by a leg structure that supports in an upright posture a container having a tubing port in a bottom portion thereof, comprising a fixed leg fixed or removably mounted to the container, a movable leg capable of moving relative to the fixed leg so as to approach and be separated in a horizontal direction from the fixed leg while supporting the container, and a connecting section for connecting the container and the fixed leg to each other, such that the container is maintained in the upright posture relative to the fixed leg.

According to the structure of the present invention, since the movable leg is capable of being opened and closed so as to approach and be separated in a horizontal direction with respect to the fixed leg, when a tubing installation is performed with respect to a tubing port provided on the bottom of the container, the interval between the movable leg and the fixed leg can be widened by opening the movable leg in a horizontal direction. More specifically, by widening the interval between the legs, the operating space beneath the container can be enlarged. Accordingly, a sufficient operating space for tubing installation can be secured around the tubing port disposed on the bottom of the container, thereby improving workability so that the tubing installation operation can easily be performed.

Further, in the aforementioned leg structure, a surrounding member is provided, which surrounds the container. The surrounding member includes a fixed portion to which the fixed leg is connected, a movable portion to which the movable leg is connected, and a hinge member, which connects the movable portion rotatably with respect to the fixed portion. The connecting section is disposed on a side surface of the container, and includes an engagement member, which hooks onto the fixed portion from above, so as to support the container in the upright posture.

In accordance with the above structure, since the movable portion to which the movable leg is attached is connected rotatably to the fixed portion through the hinge member, when the movable portion is rotated about the hinge member, the movable leg, which is attached to the movable portion, also rotates integrally with the movable portion. Accordingly, opening and closing of the movable leg can easily be carried out in a state in which the container is maintained in an upright posture by the leg structure. Further, since the container is supported in an upright posture due to the engagement member, which is provided on the side surface of the container, coming into engagement with the fixed portion, the container can be maintained in the upstanding condition even if the movable leg is in an open state.

Further, in the aforementioned leg structure, the surrounding member includes a stopper for restricting rotation of the movable portion such that the movable leg cannot be opened beyond a predetermined angle.

In accordance with the foregoing structure, since the stopper restricts opening of the movable leg, falling over of the container as a result of opening the movable leg excessively can be prevented. More specifically, although it is necessary for the plural legs to be grounded on mounting surfaces such that good balance is achieved for supporting the container in an upright posture, if the movable leg is opened too far, to such a degree that a balanced attitude cannot be maintained, there is a possibility that the leg structure could topple over together with the container. From this standpoint, the provision of the stopper, which serves to prevent excessive opening of the movable leg, is effective at preventing the container from falling over.

Thus, in accordance with the leg structure of the present invention, a tubing installation operation can easily be carried out with respect to the bottom of the container while the container is kept in an upstanding condition.

DESCRIPTION OF EMBODIMENTS

Below, an embodiment of the present invention shall be described with reference to the drawings.

Figure 1:
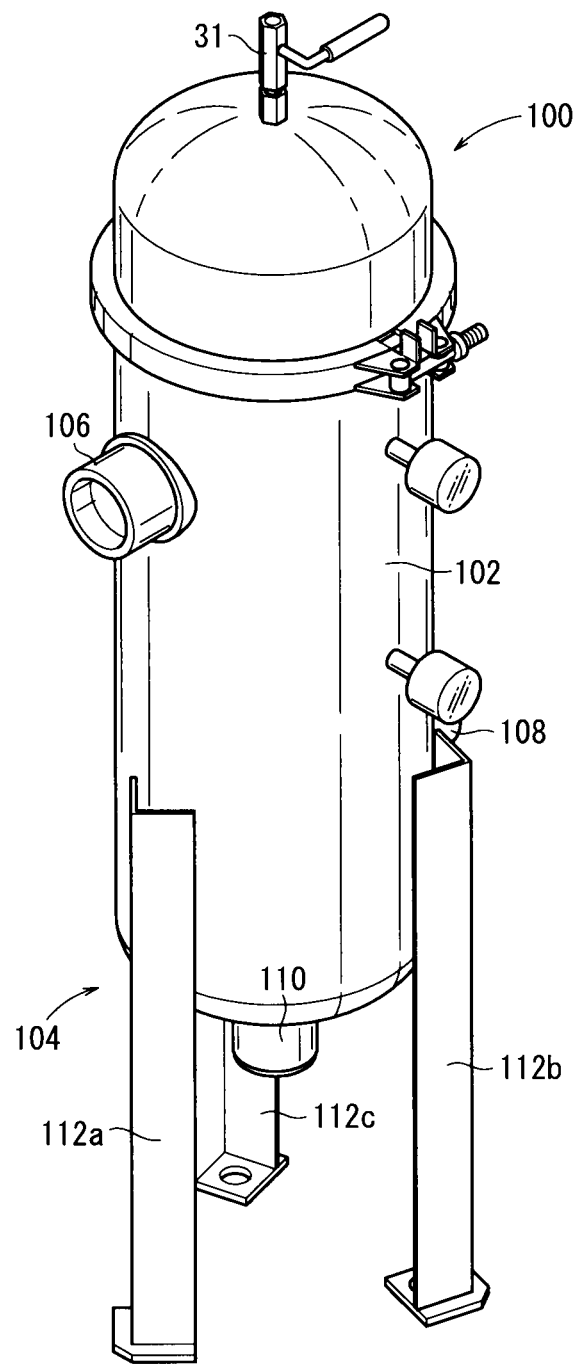
FIG. 1 is a perspective view showing a first conventional example of a leg structure.
Figure 2:
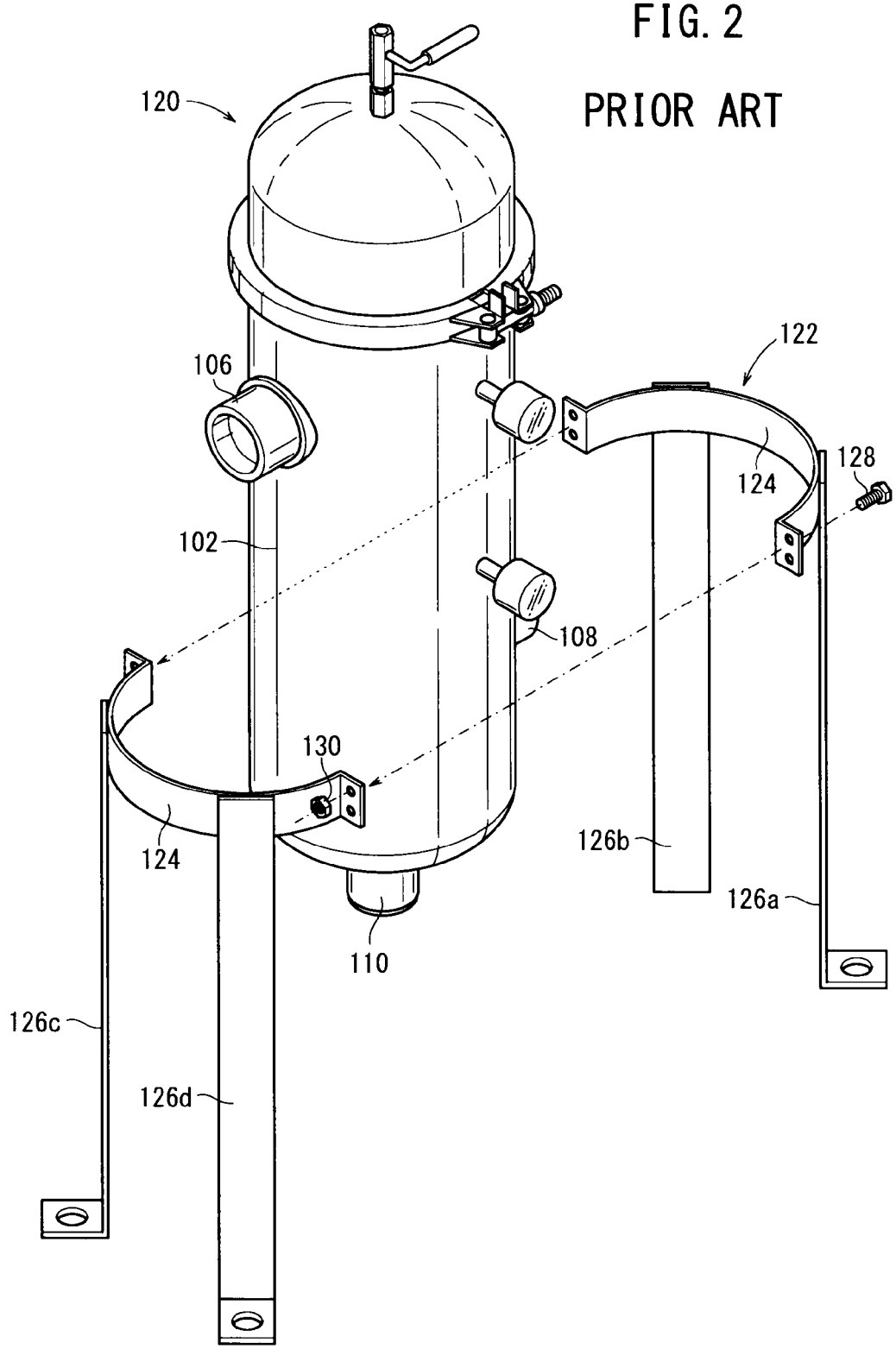
FIG. 2 is a perspective view showing a second conventional example of a leg structure.
Figure 3:
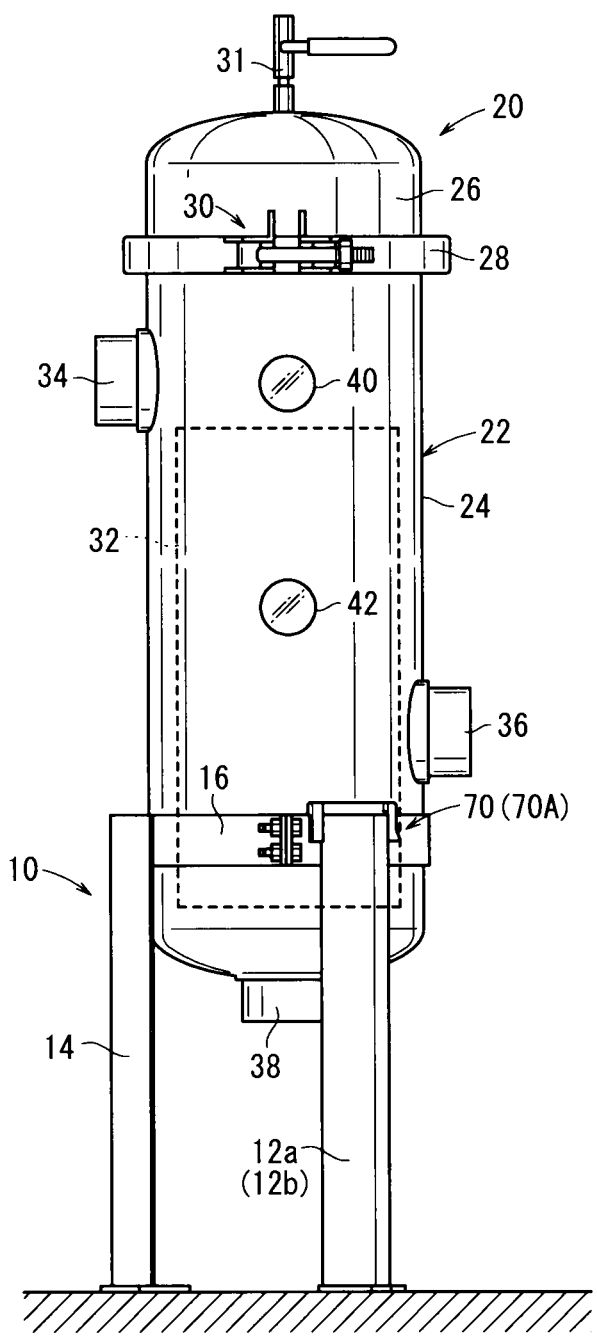
FIG. 3 is a front view showing a filter equipped with a leg structure according to an embodiment of the present invention.
Figure 4:
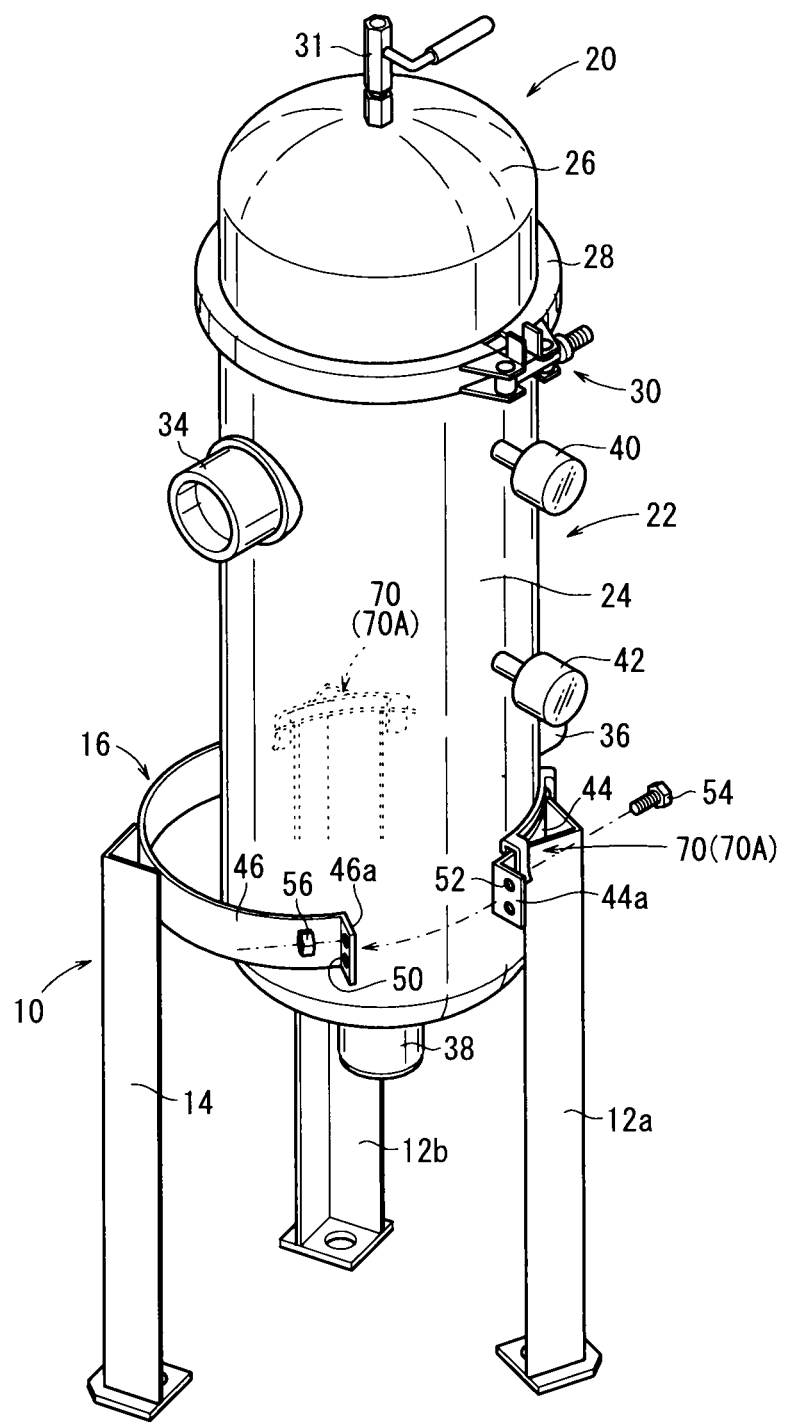
FIG. 4 is a perspective view showing the filter equipped with the leg structure according to the embodiment of the present invention.

FIG. 3 is a front view showing a filter 20 equipped with a leg structure 10 according to the embodiment of the present invention. FIG. 4 is a perspective view showing the filter 20 equipped with the leg structure 10 according to the embodiment of the present invention. As shown in FIGS. 3 and 4, the filter 20 includes a container 22, and the leg structure 10, which is attached to a lower portion of the container 22.

The container 22 is made up from a cylindrical casing 24 the upper end of which is open, which forms a portion that functions as a main body (filter main body) of the filter 20, and a dome shaped cover 26, which closes and hermetically seals the opening on the upper end of the casing 24. A flange portion (not shown), which bulges outwardly in a radial direction, is formed at the upper end of the casing 24. A flange portion (not shown), which bulges outwardly in a radial direction, also is formed on the lower end of the cover 26. A ring shaped gasket (not shown) is interposed between the cover 26 and the casing 24. By wrapping a tightening band 28 including a latch member 30 around the flange portions of the cover 26 and the casing 24, and constraining the tightening band 28 in a tightened state by operation of the latch member 30, the cover 26 and the casing 24 are fixed together tightly so as to hermetically seal the container 22. An air release valve 31, for bringing the internal pressure to zero when the container 22 is opened to perform maintenance thereon or the like, is provided at the top or apex of the cover 26.

A filter element 32 for removing foreign matter (solid components) contained within a liquid to be processed is arranged in the interior of the casing 24. The liquid to be processed, for example, is a coolant liquid, a cleaning solution, a cutting oil, industrial water or the like, in which foreign matter such as solid components or the like is mixed.

An inlet port 34 for introducing a liquid to be processed is disposed so as to project on an upper side on the outer peripheral surface of the casing 24. A discharge port 36 for discharging the processed liquid is disposed so as to project on a lower side on the outer peripheral surface of the casing 24. The filter element 32 is arranged on a liquid flow path inside the container 22 between the inlet port 34 and the discharge port 36.

A liquid removal port 38 (tubing port) for discharging liquid that has collected in the container 22, for example when a maintenance operation is carried out, is further provided on a lower portion of the casing 24. Dedicated tubing (not shown) is connected respectively to the inlet port 34, the discharge port 36, and the liquid removal port 38.

In the container 22 (filter main body) constructed in the foregoing manner, when liquid to be processed, which contains foreign matter (solid components) therein, is introduced into the container 22 through the inlet port 34, solid-liquid separation is performed by capturing the foreign matter through use of the filter element 32. Stated otherwise, the liquid is filtered and foreign matter in the liquid is removed. In addition, the liquid that has been filtered by the filter element 32 is discharged to the outside through the discharge port 36.

Further, a first pressure sensor 40 for measuring the pressure of the liquid prior to passing through the filter element 32, and a second pressure sensor 42 for measuring the pressure of the liquid after passage through the filter element 32 are disposed on the casing 24.

The leg structure 10 is a structural element for supporting the container 22 in an upright condition, including a pair of fixed legs 12a, 12b, a movable leg 14, and a connecting section 70. In the present embodiment, the fixed legs 12a, 12b are capable of being attached and detached with respect to the container 22 through a surrounding member 16. The movable leg 14 is capable of moving so as to approach and be separated in a horizontal direction with respect to the fixed leg 12a while supporting the container 22.

As shown in FIGS. 3 and 4, when the container 22 is supported by the leg structure 10, a state in which the fixed legs 12a, 12b and the movable leg 14 are positioned separately and mutually around the liquid removal port 38 (tubing port), that is, a state in which the liquid removal port 38 is positioned between the plurality of legs (the fixed legs 12a, 12b and the movable leg 14) is brought about. FIG. 4 shows a condition in which the movable leg 14 is opened, or in which the movable leg 14 is opened in a horizontal direction, such that the interval between the movable leg 14 and the fixed leg 12a is widened.

Figure 5:
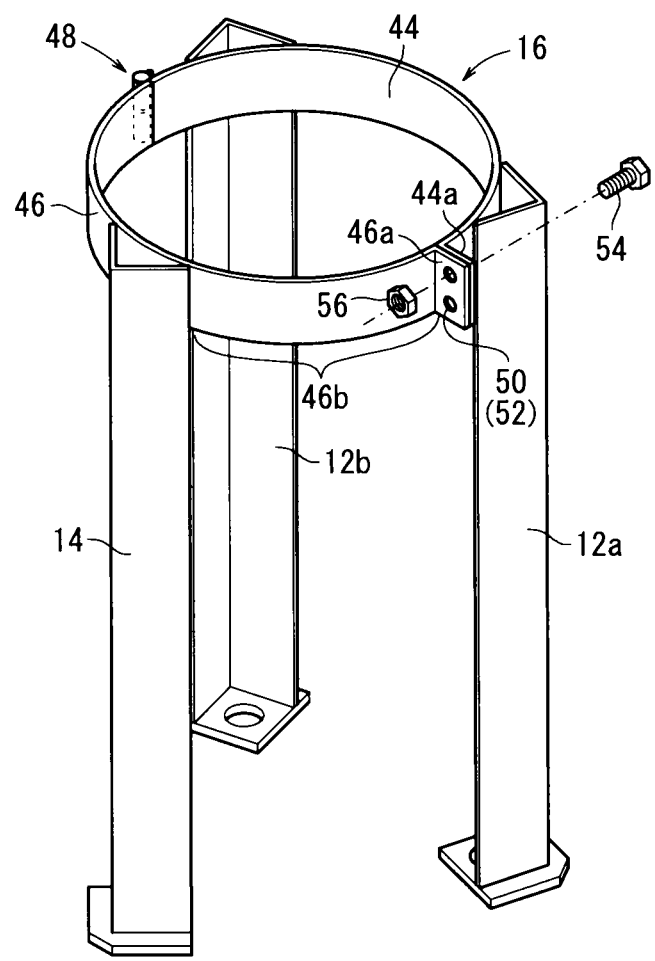
FIG. 5 is a perspective view showing fixed legs, a movable leg, and a surrounding member in the leg structure according to the embodiment of the present invention.

The leg structure 10 further is equipped with the surrounding member 16 that surrounds the container 22. FIG. 5 is a perspective view showing the fixed legs 12a, 12b, the movable leg 14, and the surrounding member 16, in the leg structure 10 according to the embodiment of the present invention. As shown in FIG. 5, the surrounding member 16 includes a fixed portion 44, to which the fixed legs 12a, 12b are attached respectively, a movable portion 46 to which the movable leg 14 is attached, and a hinge member 48 by which the movable portion 46 is made rotatable with respect to the fixed portion 44.

In the structural example shown in FIG. 5, the surrounding member 16 is constructed in a substantially annular shape as a whole, so that in a closed condition, the surrounding member 16 fits the cylindrical outer peripheral shape of the container 22. Stated otherwise, the inside diameter of the surrounding member 16 in the closed condition is set to be roughly of the same degree as the outer diameter of the casing 24.

In the present embodiment, the fixed portion 44 and the movable portion 46 form respective semicircular portions of the surrounding member 16. The fixed legs 12a, 12b are fixed to the fixed portion 44 while being separated by 120 degrees, whereas the single movable leg 14 is fixed to the movable portion 46 at a substantially central portion of the entire length of the movable portion 46. The interval between the two fixed legs 12a, 12b and the movable leg 14 is 120 degrees, in a state in which the surrounding member 16 is closed. Accordingly, the movable leg 14 and the fixed legs 12a, 12b are arranged at equal intervals on the outer circumference of the surrounding member 16. Upper end portions of the fixed legs 12a, 12b are fixed respectively to the outer circumferential surface of the fixed portion 44. The upper end portion of the movable leg 14 is fixed to the outer circumferential surface of the movable portion 46.

In the present embodiment, the surrounding member 16 is formed in a shape that extends in a circumferential direction to suitably match the cylindrical outer peripheral surface of the casing 24. However, in the case that the container 22 is shaped non-cylindrically, for example, if the container 22 has a quadrilateral tubular shape, the surrounding member 16 may be formed in a shape to fit the outer peripheral surface of the quadrilateral tubular shape.

In the present embodiment, although fixed legs 12a, 12b are attached to the fixed portion 44 by welding, the fixed legs 12a, 12b may be attached thereto by another fixing means, such as fastening by bolts or the like. Similarly, although the movable leg 14 is attached to the movable portion 46 by welding, the movable leg 14 may be attached thereto by another fixing means, such as fastening by bolts or the like.

With the present embodiment, the fixed legs 12a, 12b and the movable leg 14 extend vertically and are arranged in parallel with each other. However, in place of this structure, the fixed legs 12a, 12b and the movable leg 14 may be arranged so as to spread or fan out from one another downwardly.

With the present embodiment, two fixed legs 12a, 12b are provided as fixed side legs, and one movable leg 14 is provided as a movable side leg. However, either one of the fixed legs 12a, 12b may be dispensed with, whereas the movable leg 14 may be increased in number to result in two movable legs. Further, the total number of the fixed legs 12a, 12b and the movable leg 14 is not limited to three, but may be four or more. In this case, the fixed legs 12a, 12b and the movable leg 14 are arranged at equal intervals in the circumferential direction, so as to be capable of stably supporting the container 22.

The hinge member 48 forms a part that connects the fixed portion 44 and the movable portion 46 so as to be capable of rotation mutually about a vertical axis. Accordingly, the movable portion 46 can be rotated in a horizontal direction, i.e., is turnable horizontally, about the hinge member 48.

On the fixed portion 44 and the movable portion 46, flanges 44a, 46a are formed respectively, which project radially outward on ends of the side opposite to the side on which the hinge member 48 is disposed. Bolt holes 50, 52 (see FIG. 4), which penetrate therethrough in the thickness direction (i.e., in a horizontal direction perpendicularly with respect to the flanges 44a, 46a) are formed in each of the flanges 44a, 46a. Bolts 54 are inserted into the bolt holes 50, 52, and the flanges 44a, 46a are tightly fastened by screw-engagement of nuts 56 onto the bolts 54, to thereby restrain movement of the movable leg 14.

Figure 6A:
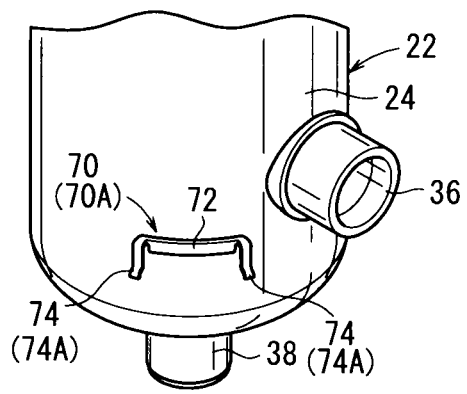
FIG. 6A is a perspective view, with partial omission, showing a condition in which a receiving member is not yet engaged with the surrounding member.
Figure 6A:
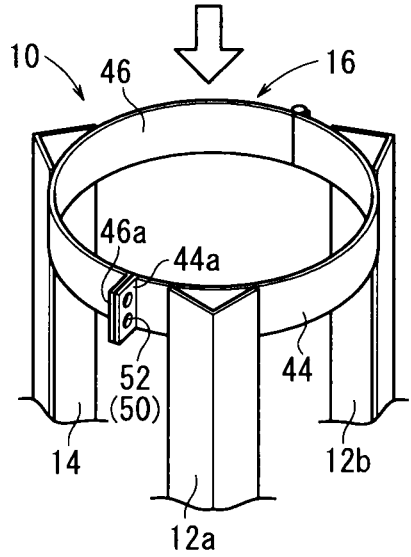
Figure 6B:
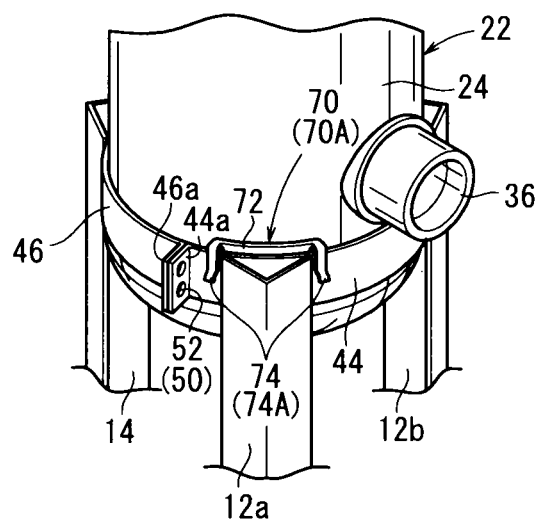
FIG. 6B is a perspective view, with partial omission, showing a condition in which the receiving member is placed in engagement with the surrounding member.

FIG. 6A and 6B are perspective views, with partial omission, for explaining the condition of engagement between the container 22 and the leg structure 10. As shown in FIGS. 6A and 6B, on the outer peripheral surface of the casing 24, receiving members 70A are provided, which serve as one form of the connecting section 70 that connects the container 22 to the fixed legs 12a, 12b in a manner to maintain the upright posture of the container 22 with respect to the fixed legs 12a, 12b. In the present embodiment, the receiving members 70A are fixed securely to the outer peripheral surface of the casing 24 by welding, although they may be fixed to the outer peripheral surface of the container 22 by another fixing means such as fastening or the like.

The receiving member 70A shown in FIGS. 6A and 6B includes a base member 72 that extends in a circumferential direction along the outer peripheral surface of the casing 24, and hooks 74A that serve as one form of an engagement member 74, which project outwardly from opposite ends of the base member 72 and extend in a downward direction. In the present embodiment, as shown in FIG. 4, another receiving member 70A having the same structure also is disposed in a position corresponding to the other fixed leg 12b, such that a total of two receiving members 70A are disposed on the outer peripheral surface of the casing 24.

As shown in FIGS. 6A and 6B, the hooks 74A on both sides of the base member 72 are disposed at a certain gap, which strides over the fixed leg 12a (12b). The receiving members 70A possess sufficient strength (rigidity), such that the shape thereof is maintained even at times that the weight of the container 22 acts or is imposed on the receiving members 70A. The material quality and shape of the receiving members 70A are set such that, by hooking the receiving members 70A onto the fixed portion 44, the condition of the container 22 can be securely retained in an upright posture.

In the case that the container 22 is to be supported by the leg structure 10, first, as shown in FIG. 6A, the container 22 is inserted from above into the interior of the surrounding member 16. Upon doing so, as shown in FIG. 6B, the hooks 74A of the receiving members 70A are hooked from above onto the upper edge of the fixed portion 44 of the surrounding member 16, such that the inner circumferential surface of the fixed portion 44 and the outer peripheral surface of the casing 24 come into abutment, together with the outer circumferential surface of the fixed portion 44 and inner surfaces of the hooks 74A coming into abutment, so as to support the container 22 stably in an upright posture.

In the present embodiment, although only two receiving members 70A are provided, the number of receiving members 70A may be increased so that the container 22 can be supported more stably. The receiving members 70A in the present embodiment are of a structure in which the hooks 74A are connected to opposite ends of the base member 72, and the base member 72 is fixed to the outer peripheral surface of the casing 24. However, alternatively, the base member 72 may be dispensed with, and the hooks 74A may be fixed directly onto the outer peripheral surface of the casing 24.

In the present embodiment, the hooks 74A have been described as one form of engagement members 74, which are hooked onto the upper edges of the fixed portion 44. However, as another form of engagement members 74, pin or bar shaped insertion members, which extend downwardly from positions that project outwardly from the outer peripheral surface of the casing 24, may be provided on the outer peripheral surface of the casing 24, whereas fitting parts including insertion holes that extend vertically and into which the insertion members are inserted from above may be provided on the outer circumferential surface of the fixed portion 44. With such a structure, the container 22 can also be stably supported in an upright posture.

Figure 7:
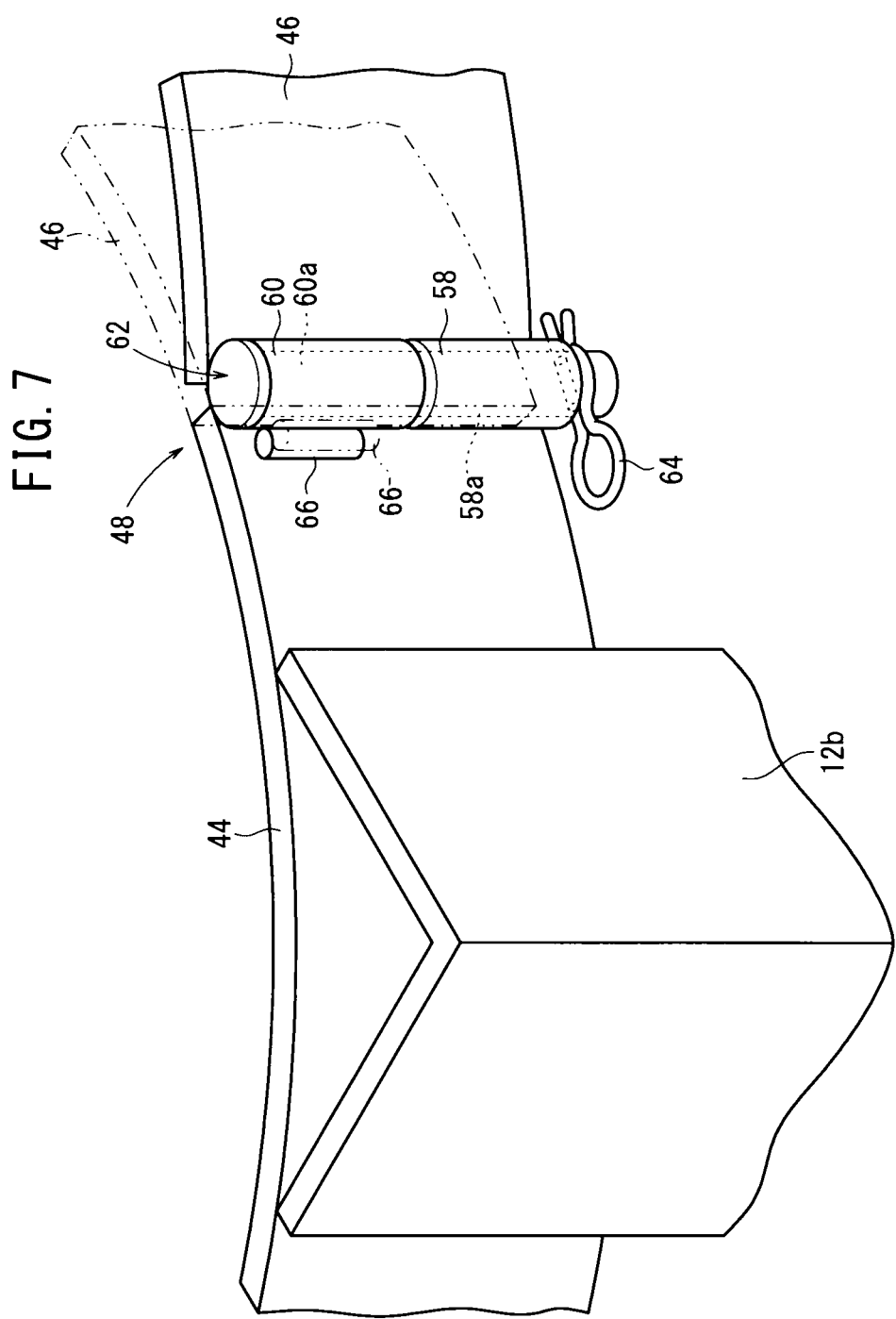
FIG. 7 is an enlarged perspective view, with partial omission, showing a hinge member and portions in the vicinity thereof.

FIG. 7 is an enlarged perspective view, with partial omission, showing the hinge member 48 and portions in the vicinity thereof. As shown in FIG. 7, the hinge member 48 includes a fixed side cylinder 58, which is connected to one end of the fixed portion 44 of the surrounding member 16 and has a pin hole 58a that penetrates therethrough in a vertical direction, a movable side cylinder 60, which is connected to one end of the movable portion 46 of the surrounding member 16 and has a pin hole 60a that penetrates therethrough in the vertical direction, a hinge pin 62, which is inserted into the pin hole 58a of the fixed side cylinder 58 and the pin hole 60a of the movable side cylinder 60, and a latch pin 64 for stopping removal (i.e., to prevent pulling out) of the hinge pin 62. In accordance with the hinge member 48 constructed in this manner, the movable portion 46 can be rotated in a horizontal direction smoothly about a vertical axis with respect to the fixed portion 44.

In the present embodiment, the surrounding member 16 further includes a stopper 66 for restricting rotation of the movable portion 46 such that the movable leg 14 cannot be opened beyond a predetermined angle. The stopper 66 is a protrusive structural element, which is disposed on the outer circumferential surface of the movable side cylinder 60, and with the structure shown in FIG. 7, forms a vertically extending cylindrical shaped member. However, the stopper 66 may also form a protrusive structural element of another shape. Further, the stopper 66 may comprise another means, not necessarily a protrusive structural element, which restricts the angle of rotation of the movable portion 46.

Figure 8A:
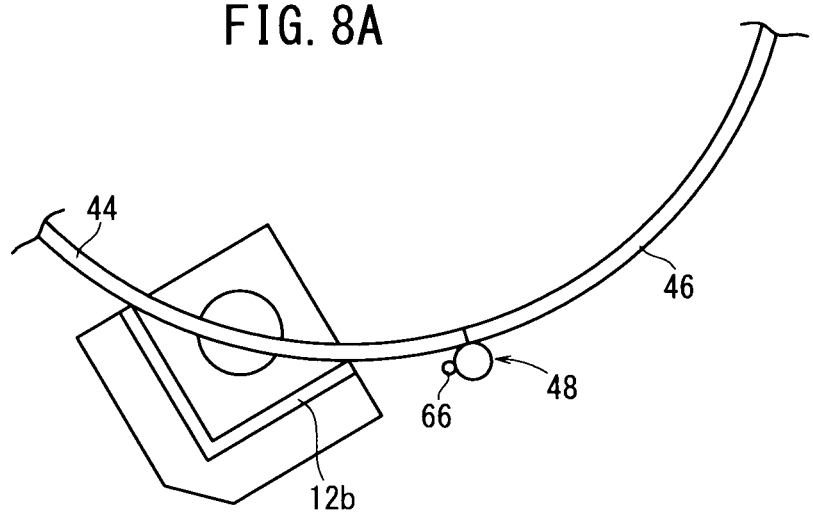
FIG. 8A is an outline schematic view showing a condition in the leg structure in which the movable member is closed.
Figure 8B:
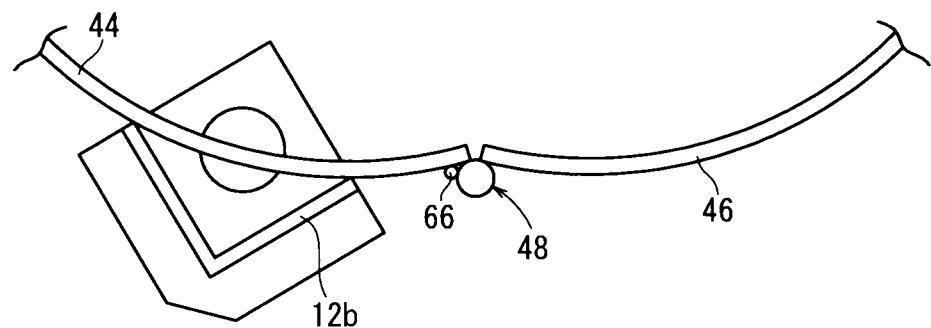
FIG. 8B is an outline schematic view showing a condition in the leg structure in which the movable member is opened.

FIG. 8A is an outline schematic view as viewed in plan of the hinge member 48 and portions in the vicinity thereof of the leg structure 10 (see FIG. 5), in a condition in which the movable leg 14 (movable portion 46) is closed. In this state, as shown in FIG. 8A, the stopper 66 is not in contact with the fixed portion 44. As shown in FIG. 8B, when the movable portion 46 is rotated a predetermined angle in a direction to open with respect to the fixed portion 44, because the stopper 66 comes into abutment against the outer circumferential surface of the fixed portion 44, further rotation of the movable portion 46 is prevented. Consequently, excessive opening of the movable leg 14, which is fixed to the movable portion 46, is prevented. The position at which the stopper 66 is fixed on the movable side cylinder 60 is set such that falling or toppling over of the container 22 due to the movable leg 14 being opened excessively can be prevented.

According to the leg structure 10 of the present embodiment, which is formed in the foregoing manner, since the movable leg 14 is constructed to be openable and closable to approach and separate in a horizontal direction with respect to the fixed leg 12a, the interval between the movable leg 14 and the fixed leg 12a can be enlarged by opening the movable leg 14 horizontally when a tubing installation is to be performed with respect to the liquid removal port 38 (tubing port) disposed on the bottom of the container 22. More specifically, by widening the interval between the movable leg 14 and the fixed leg 12a, the space beneath the container 22 can be enlarged. Accordingly, a sufficient operating space for tubing installation can be secured around the tubing port disposed on the bottom of the container 22, thereby improving workability so that the tubing installation operation can easily be performed.

Further, according to the leg structure 10 of the present embodiment, because the movable portion 46 to which the movable leg 14 is attached is connected to the fixed portion 44 rotatably via the hinge member 48, the movable leg 14 that is attached to the movable portion 46 is rotatable integrally therewith. Consequently, while the container 22 is supported in an upstanding state by the leg structure 10, opening and closing of the movable leg 14 can easily be carried out. Further, because the container 22 is supported in an upstanding posture by engagement of the receiving members 70A of the container 22 with the fixed portion 44, the upstanding condition of the container 22 can be maintained even if the movable leg 14 is in an opened state.

According to the leg structure 10 of the present embodiment, since the state of opening of the movable leg 14 is restricted by the stopper 66, falling or toppling over of the container 22 due to the movable leg 14 being opened excessively can be prevented. More specifically, in the leg structure 10, although it is necessary for the plural legs to be grounded on the mounting surface such that good balance is achieved for supporting the container 22 in an upright posture, if the movable leg 14 is opened too far, to such a degree that a balanced attitude cannot be maintained, there is a possibility that the leg structure 10 could topple over together with the container 22. From this standpoint, the provision of the stopper 66, which serves to prevent excessive opening of the movable leg 14, is effective at preventing the container 22 from falling over.

The leg structure 10 according to the present invention is not limited by the above-described embodiment, and it is a matter of course that various other or additional structural features could be adopted without deviating from the essence of the invention.

Apart from supporting the container 22 of the filter 20, the leg structure 10 of the present invention can be used to support different types of apparatus containers or tanks.

In the above-described embodiment, the fixed legs 12a, 12b and the movable leg 14 are fixed to the surrounding member 16 and are constructed integrally therewith, whereby the container 22 is supported by engagement of the receiving members 70A, which are disposed on the outer peripheral surface of the casing 24, with the surrounding member 16. However, in place of this structure, the following configuration may be adopted.

More specifically, as another configuration for the connecting section 70, the fixed portion 44 may be fixed to the outer peripheral surface of the casing 24 by another fixing means such as welding or by bolts or the like.

Further, the fixed legs 12a, 12b may be attached respectively by welding to the casing 24, or alternatively, the fixed legs 12a, 12b may each be detachably fixed with respect to the casing 24 by a suitable fixing means such as respective bolts or the like. One end of a swinging member may be connected to the casing 24 through a hinge structure so as to be swingable about a vertical axis, and the movable leg 14 may be fixed to another end of the swinging member. In accordance with this structure as well, since the movable leg 14 is capable of opening and closing, so as to approach or be separated in a horizontal direction with respect to the fixed leg 12a, the interval between the movable leg 14 and the fixed leg 12a can be widened by opening the movable leg 14 in a horizontal direction when the tubing installation is carried out with respect to the liquid removal port 38 (tubing port), which is provided on the bottom of the container 22. More specifically, by widening the interval between the movable leg 14 and the fixed leg 12a, the space beneath the container 22 can be enlarged. Accordingly, a sufficient operating space for tubing installation can be secured around the liquid removal port 38 (tubing port) disposed on the bottom of the container 22, thereby improving workability so that the tubing installation operation can easily be performed.

Although in the present embodiment, the surrounding member 16 is formed to surround and enclose the outer peripheral surface of the casing 24 by one circumference thereof, the surrounding member 16 may be formed to surround the outer peripheral surface of the casing 24 by a range that does not amount to one circumference. For example, on the surrounding member 16 shown in FIG. 5, the movable portion 46 includes a portion 46b, which extends from the portion where the movable portion 46 is connected with the movable leg 14 up to the other end (i.e., the end where the flange 44a is disposed) of the fixed portion 44. However, the portion 46b may be shortened or omitted altogether. In this case, although the flange 46a and the flange 44a cannot be connected to each other, in place thereof, a suitable means for fixing the movable portion 46 to the casing 24 may be provided on the other end (i.e., an end on an opposite side from the hinge member 48) of the movable portion 46.

The invention claimed is:

1. A leg structure that supports in an upright posture a container having a tubing port in a bottom portion thereof, comprising:
    a fixed leg fixed or removably mounted to the container;
    a movable leg capable of moving relative to the fixed leg so as to approach and be separated in a horizontal direction from the fixed leg while supporting the container; and
    a connecting section for connecting the container and the fixed leg to each other, such that the container is maintained in the upright posture relative to the fixed leg,
    a hinge member disposed at a higher position than the tubing port;
    a movable portion that extends in a circumferential direction around the container and is rotatable about a vertical axis at the hinge member,
    wherein the movable leg is fixed to the movable portion,
    wherein as the movable portion rotates, an interval between the movable leg and the fixed leg changes, and
    wherein in a state in which the container is supported by the leg structure, the container is fixed in the upright posture, and the fixed leg and the movable leg are arranged around the tubing port.

2. The leg structure according to claim 1, further comprising a surrounding member that surrounds the container and is ring shaped,
    wherein the surrounding member includes a fixed portion to which the fixed leg is connected and that extends in the circumferential direction along an outer surface of the container, a movable portion to which the movable leg is connected and that extends in the circumferential direction along the outer surface of the container, and the hinge member, which connects the movable portion rotatably with respect to the fixed portion, and
    wherein the connecting section is disposed on a side surface of the container, and includes an engagement member, which hooks onto the fixed portion from above, so as to support the container in the upright posture.

3. The leg structure according to claim 2, wherein the surrounding member includes a stopper for restricting rotation of the movable portion such that the movable leg cannot be opened beyond a predetermined angle.

4. A leg structure that supports in an upright posture a container having a tubing port in a bottom portion thereof, comprising:
    a fixed leg fixed or removably mounted to the container;
    a movable leg capable of moving relative to the fixed leg so as to approach and be separated in a horizontal direction from the fixed leg while supporting the container;
    a connecting section for connecting the container and the fixed leg to each other, such that the container is maintained in the upright posture relative to the fixed leg; and
    a surrounding member that surrounds the container,
    wherein the surrounding member includes a fixed portion to which the fixed leg is connected, a movable portion that extends in a circumferential direction around the container and to which the movable leg is connected, and a hinge member, which is disposed at a higher position than the tubing port and connects the movable portion rotatably about a vertical axis with respect to the fixed portion,
    wherein as the movable portion rotates, and interval between the movable leg and the fixed leg changes, and
    wherein the connecting section is disposed on a side surface of the container, and includes an engagement member, which hooks onto the fixed portion from above, so as to support the container in the upright posture.

5. The leg structure according to claim 4 wherein the surrounding member includes a stopper for restricting rotation of the movable portion such that the movable leg cannot be opened beyond a predetermined angle.

6. The leg structure according to claim 1, wherein the leg structure takes a first state in which the movable leg is closed, and a second state in which the interval between the movable leg and the fixed leg is wider than the first state,
    wherein in the first and second states, the fixed leg stays at the same position and takes the same posture with respect to the container, and
    wherein when the leg structure changes from the first state to the second state, the movable leg as a whole moves away from the container.

7. The leg structure according to claim 4, wherein the leg structure takes a first state in which the movable leg is closed, and a second state in which the interval between the movable leg and the fixed leg is wider than the first state,
    wherein in the first and second states, the fixed leg stays at the same position and takes the same posture with respect to the container, and
    wherein when the leg structure changes from the first state to the second state, the movable leg as a whole moves away from the container.

* * * * *